United States Patent Office 3,513,226
Patented May 19, 1970

3,513,226
VINYLIDENE CHLORIDE COPOLYMER
COMPOSITIONS
Tetsuya Hotta, Iwaki-shi, Japan, assignor to Kureha
 Kagaku Kogyo Kabushiki Kaisha, Tokyo-to, Japan,
 a joint-stock company of Japan
No Drawing. Filed Mar. 17, 1967, Ser. No. 623,804
Claims priority, application Japan, Mar. 26, 1966,
41/18,634
Int. Cl. C08f *19/08, 19/20*
U.S. Cl. 260—876        4 Claims

ABSTRACT OF THE DISCLOSURE

By powder blending in a conventional blender a copolymer resin of vinylidene chloride and a monomer copolymerizable with vinylidene chloride, a "rubber plastic" prepared by polymerization of a mixture of at least one monomer, a divinyl cross-linking agent, and a latex containing a rubber component whose principal monomer constituent is a 1,3-conjugated diene, and a stabilizer and (or) plasticizer, it is possible to produce a copolymer composition which can be readily formed by an ordinary extruder into shaped articles such as films and bottles which are highly transparent and retain their toughness at low temperatures.

---

This invention relates to compositions of copolymer resins of the vinylidene chloride series. More particularly, the invention concerns improvements in or relating to compositions of the above defined character.

As is known in the art, shaped articles or formed structures such as films or vessels can be formed from compositions produced by adding modifiers such as plasticizers and stabilizers to copolymer resins each having as its principal component a vinylidene chloride copolymer resulting from the copolymerization of from 60 to 95 parts by weight of vinylidene chloride and from 5 to 40 parts by weight of another monomer copolymerizable therewith. These shaped articles have very low permeability with respect to water and gases and, therefore, are being used for packaging food products which easily deteriorate in air.

Shaped articles of the above stated character tend to become brittle at low temperatures, that is, are subject to low-temperature embrittlement. As a measure to prevent this tendency, the technique of admixing various materials having rubber-like elasticity with the ingredients of the vinylidene chlroide copolymers for these shaped articles has been known for many years. For example, U.S. Pat. 2,658,053, issued in 1953, has proposed the production of a transparent film by admixing, in special proportions, chloroprene and butadiene-acrylonitrile rubber with a vinylidene chloride resin. In addition, there are a large number of patents relating to the prevention of low-temperature embrittlement by admixing butadiene-acrylonitrile rubbers with vinylidene copolymers.

However, since elastomers, in general, and vinylidene chloride copolymers are incompatible, it is extremely difficult to obtain therefrom compositions which can be formed into articles which are transparent and possess toughness at low temperatures. Known methods for producing such compositions are limited to special blending proportions as in the above mentioned U.S. Pat. 2,658,053 or involve complicated processes such as preparing an elastomer emulsion and an emulsion of a vinylidene chloride resin, mixing the two emulsions, and then subjecting the resulting mixture to salting out.

It is an object of the present invention to provide compositions of vinylidene chloride resins which, when formed into structures, possess toughness at low temperatures and yet retain the characteristics of ordinary shaped articles of vinylidene chloride resins, particularly transparency, low gas permeability, and flexibility.

Another object of the invention is to provide compositions of the above stated character which can be produced through the use of very ordinary powder blenders and extruders in a process of mixing of an ingredient herein referred to as a "rubber plastic" and a vinylidene chloride resin in powder form and fabricating shaped articles without the necessity of resorting to techniques such as special blending methods or mixing of emulsions. The admixing of this rubber plastic, which will be described more fully hereinafter, is for the purpose of overcoming low-temperature embrittlement, which is a disadvantage of shaped articles of vinylidene chloride resins.

According to the present invention, briefly summarized, there are provided compositions of vinylidene chloride copolymers for forming shaped articles thereof, each composition being characterized in that it is produced by mixing a known vinylidene chloride polymer (A), a rubber plastic (B) prepared by causing after-polymerization of a vinyl monomer (b) and a divinyl cross-linking agent (c) with a latex of diene rubber (a), and a known stabilizer and (or) a plasticizer (C).

The special rubber plastic (B) according to the invention is completely different from rubber-like elastic substances known heretofore, being, itself, a solid powder in powdery form and can be readily subjected to powder mixing with a powder of vinylidene chloride resin. Furthermore, when this rubber plastic, itself, is heat-formed, the resulting article exhibits substantially the properties of plastics and is not a rubber-like elastic substance.

Rubber-like elastic substances known heretofore can be mixed to some extent with vinylidene chloride resins in some cases by mixing and kneading-in a powerful mixer such as a Banbury mixer, but formed structures produced from the resulting mixtures are not transparent, and when these mixtures are extruded by means of an ordinary extruder, only products of very nonuniformly dispersed and mixed ingredients can be obtained.

The rubber plastic of the present invention can be prepared by the following process. One or more vinyl monomers (b) selected from among styrene, methylmethacrylate, vinylidene chloride, and 2,3-dichlorobutadiene and a small quantity of a divinyl cross-linking agent (c) are caused to graft polymerize with a copolymer rubber (a) which is a polymer rubber of a 1,3-conjugated diene, such as butadiene or a copolymer rubber obtained by copolymerization of a 1,3-conjugated diene (e.g. butadiene) as the principal ingredient and a monomer copolymerizable therewith.

The above mentioned graft polymerization may be carried out, in general, by mixing a monomer mixture of one or more vinyl monomers (b) and the divinyl cross-linking agent (c) with a latex of butadiene polymer or copolymer rubber (a) and causing the monomer mixture to be adsorbed on the rubber component within the latex. Alternatively, in some cases, it is also possible to accomplish this graft polymerization by a process such as that of dividing the monomers to be grafted into separate portions, adding one portion of the monomers to carry out polymerization, adding the remaining portion after this polymerization has been almost completed, and carrying out further polymerization.

In the latter process, the kind or composition of the monomers to be divided and added can be suitably selected, and the time at which the divinyl cross-linking agent is added can also be selected as desired.

Furthermore, this divisional graft copolymerization can be carried in two or more divisional stages, and the monomers to be added in these stages may respectively be of completely different kinds.

By salting out an emulsion of the polymer obtained in the above described manner, a rubber plastic powder in the form of fine particles is obtained. When dried, this rubber plastic can be directly powder blended with a vinylidene chloride polymer thereby to produce a resin composition according to the invention.

It has been found, furthermore, that in the rubber plastic of the invention, the proportioning of the rubber component and plastic component thereof is also important. When the transparency of the ultimate shaped article is not a problem, and only the effect of preventing low-temperature embrittlement is a problem, it is desirable, of course, to use as high a rubber content as possible. However, if the rubber content is increased to an extreme value, the process material will agglomerate into lumps in the salting out and drying steps, or the blending of the rubber plastic powder with the vinylidene chloride resin powder will be impaired, whereby the resulting effect will be that a uniform mixing cannot be achieved, and the ultimate shaped article will be nontransparent.

On the other hand, when the rubber content is less than 50 percent by weight, its effect of preventing low-temperature embrittlement cannot be obtained. I have found that a compositional ratio by weight of the rubber content to the plastic content in the rubber plastic of from 50:50 to 80:20 is desirable.

As the rubber component (a), a 1,3-conjugated diene homopolymer rubber such as a butadiene, isoprene, or chloroprene rubber or a copolymer rubber obtained by copolymerization of a 1,3-conjugated diene as the principal ingredient and a vinyl compound polymerizable there-with as, for example, styrene, acrylonitrile, methyl methacrylate, vinylidene chloride, and 2,3-dichlorobutadiene, can be used. It has been found that in the case where a copolymer rubber is used, a content of the 1,3-conjugated diene of 50 percent or more by weight produces good results. Furthermore, during the polymerization of the rubber component, from 0.01 to 5 percent by weight of a divinyl cross-linking agent may be added and copolymerized.

The synthesis of the aforementioned rubber latex is carried out by the generally known emulsion polymerization method.

The aforementioned plastic component is obtained by causing a single vinyl monomer or a mixture of vinyl monomers and a small quantity of a divinyl compound cross-linking agent to be adsorbed on the rubber component latex, the vinyl monomer or monomers being selected from styrene, methylmethacrylate, vinylidene chloride and 2,3-dichlorobutadiene. In some cases, it is preferable to carry out adsorption and polymerization of the plastic component in two or more divisional stages thereby to increase further the transparency of the ultimate product.

The cross-linking agent (c) should be selected from among substances which copolymerize well with the monomer or monomers used such as a 1,3-conjugated diene, styrene methylmethacrylate and vinylidene chloride. Examples of such cross-linking agents which can be used are divinyl benzene, ethylene glycol dimethacrylates, that is, mono-, di-, tri-, and tetraethylene glycol dimethylacrylates, and 1,3-butylene glycol dimethacrylates. The quantity of the cross-linking agent used is from 0.01 to 5 percent by weight with respect to the quantity of the monomer or monomers.

The term "vinylidene chloride copolymer" is used herein to designate a copolymer which has crystallinity in its normal state and has vinylidene chloride as its basic ingredient, and which is prepared by causing copolymerization of from 60 to 95 parts by weight of vinylidene chloride and from a total quantity of from 5 to 40 parts by weight of one or more other monomers copolymerizable with vinylidene choloride.

Examples of monomers copoylmerizable with vinylidene chloride are vinyl chloride, vinyl acetate, vinyl propionate, acrylonitrile, acrylic acid, maleic acid, fumaric acid, itaconic acid, anhydrides of these acids, alkyl and aralkyl esters, having 8 or fewer atoms of carbon, of these acids, acrylamide vinylalkyl ether, vinylalkyl ketones, acrolein, allyl esters and ethers, butadiene, chloroprene, and 2,3-dichlorobutadiene.

The blending proportions, according to the present invention, of the rubber plastic (B) and the vinylidene chloride polymer (A) are from 5 to 30 parts by weight of the rubber plastic (B) with respect to 100 parts by weight of the polymer (A). If necessary, a plasticizer (C) and (or) stabilizer for vinylidene chloride, such as acetyltributyl citrate, dibutyl sebacate, epoxidated soybean oil, and 2,4-dimethyl-6-(1-methyl-cyclohexyl) phenol, can be incorporated in the total quantity of from 0.01 to 15 parts by weight. In addition, talc, silica, and other additives known in the art which do not impart an adverse effect on the characteristics of the product composition can be incorporated.

While, in the blending of the above described ingredients, the above defined ingredients (A), (B), and (C) may be blended simultaneously in an ordinary blender, it is preferable to blend first the ingredients (A) and (C) and then to add ingredient (B) to the resulting mixture and carry out blending again.

The compositions obtained in accordance with the present invention are in the form of powder which, when extruded, result in substantially transparent shaped articles which can be subjected to ordinary operations such as elongation.

The nature and utility of the invention will be more clearly apparent from the following examples, it being understood that these examples are merely illustrative embodiments of the invention and are not intended to limit the scope of the invention. In these examples the proportions set forth, unless otherwise specified, are by weight.

EXAMPLE 1

A monomer mixture consisting of 1.0 g. (gramme or gram) of cumene hydroperoxide, 1,000 g. of butadiene, 300 g. of styrene, and 5 g. of triethylene glycol dimethacrylate and 3,000 g. of distilled water containing 10 g. of potassium oleate, 0.05 g. of EDTA-disodium dihydride, 0.5 g. of Rongalite ($CH_2OHSO_2Na \cdot 2H_2O$, 99% pure), 0.03 g. of ferrous sulphate ($FESO_4 \cdot 7H_2O$), and 0.15 g. of sodium pyrophosphate were charged under vacuum into a 10-litre autoclave provided with an agitator. The process materials thus charged were then caused to react at 40 degrees C. for approximately 17 hours, at which time no further drop in pressure could be observed.

Then, to the resulting batch, a monomer mixture of 350 g. of methyl methacrylate containing 0.7 g. of cumene hydroperoxide and 3.5 g. of triethylene glycol dimethacrylate and 350 g. of styrene, 0.35 g. of Rongalite, and 2,100 g. of distilled water were added, and the resulting batch was agitated at high speed for 30 minutes. Thereafter, the temperature of the batch was raised to 60 degrees C, and materials were caused to react for 6 hours, whereupon a latex was obtained.

This latex was subjected to salting out with a 1-percent hydrochloric acid solution, neutralized with sodium pyrophosphate, and filtered. A powder substance in loose powdery form was thus filtered out, washed with water, and dried, whereupon a rubber plastic resin of an $\eta_{sp./c.}$ of 0.028 (as measured with 4 g./litre benzene solution) was obtained with a yield of 98.5 percent.

Separately, 5 parts of acetyl tributyl citrate and 1 part of epoxidated soybean oil were added to 100 parts of a vinylidene chloride resin prepared by suspension polymerization from 80 parts of vinylidene chloride and 20 parts of vinyl chloride, and the resulting batch was dry blended for 2 hours at 60 degrees C in a vane blender.

To this batch, 20 parts of the aforedescribed rubber plastic of $\eta_{sp./c.}=0.028$ was added, and the resulting batch was mixed for approximately 20 minutes at room temperature to produce a compound.

This compound was heated and melt-extruded into a tubular structure by means of an ordinary screw extruder, and the molten tubular structure was then rapidly cooled by an ordinary process in a cooling bath at a temperature of from 5 to 20 degrees C. The tubular structure was taken out of the cooling bath was filled with air under pressure between two pairs of pinch rolls of respectively different rotating surface speeds and thereby inflated and stretched into a film of 0.04-mm. thickness.

The low-temperature brittleness of the film thus obtained was tested and indicated in the following manner. A large number of test pieces of the tubular film, each of a flat folded width of 50 mm., was filled with 145 cc. of water, and the two ends thereof were sealed by binding. Each test piece thus prepared was cooled to a temperature of 5 degrees C and dropped from a height of 2 metres onto the floor. The degree of low-temperature brittleness of the film was expressed by the number of test pieces which burst or developed pin holes out of 100 test pieces tested.

The degree of low-temperature brittleness, light transmission, and oxygen transmission of the above described film produced from a composition according to the present invention were compared with those of a film produced by blending 5 parts of acetyl tributyl citrate and 1 part of expoxidated soybean oil with 100 parts of the same vinylidene chloride resin as described above. The comparative values are shown in the following table, from which it is apparent that the low-temperature brittleness is substantially improved (reduced) in the film produced from the blend of the present invention.

15 parts of this rubber plastic, 5 parts of acetyl tributyl citrate, and 0.03 part of a silicate powder as a filler were mixed with 100 parts of a copolymer resin prepared by suspension polymerization from 70 parts of vinylidene chloride and 30 parts of vinyl chloride.

The rubber plastic of this example produced greater fluidity of the powder mixture than that of Example 1, and the feeding of the powder from the extruder hopper to the extruder was accomplished with even greater facility.

The composition thus obtained was formed into a film of 0.035-mm. thickness by the ordinary air inflation method. The low-temperature brittleness of this film as measured by the same method as in Example 1 was 5 percent in terms of percentage of ruptured test pieces. In comparison, a similar film produced through the use of only 5 percent of acetyl tributyl citrate with respect to 100 parts of the vinylidene chloride resin exhibited a percentage of ruptured test pieces of 88 percent.

EXAMPLE 4

In the recipe for the preparation of the rubber plastic in Example 1, only 5 g. of triethylene glycol dimethacrylate used in the synthesis of the rubber latex was omitted. In all other respects the polymerization and after treatment were carried out in accordance with the procedure of Example 1, whereupon a resin powder was obtained with a yield of 96 percent.

5 parts of acetyl tributyl citrate and 1 part of epoxidated soybean oil were blended in a vane blender at 60 degrees C. for 2 hours with 100 parts of a vinylidene chloride copolymer resin prepared by suspension polymerization from 80 parts of vinylidene chloride and 20 parts of vinyl chloride. Then, with the resulting blend, 20 parts of

| FILM | Composition blend, ingredients blended with 100 parts by weight of vinylidene chloride resin: (parts). | Low-temperature brittleness (percent ruptured) | Light transmission (percent through 450 m$\mu$) | Oxygen transmission at 30° C. (cc. cm. cm.²/sec. cm. Hg) |
|---|---|---|---|---|
| Film from composition of invention. | Example 1: Rubber plastic (20) Acetyl tributyl citrate (5) Epoxidated soybean oil (1) | 23 | 87 | $3.5 \times 10^{-12}$ |
| Reference film for comparison. | Acetyl tributyl citrate (5) Epoxidated soybean oil (1) | 100 | 89 | $4.5 \times 10^{-12}$ |

EXAMPLE 2

20 g. of divinylbenzene was added to the rubber component, and 10 g. of divinylbenzene was added to the plastic component instead of the triethylene glycol dimethacrylate in the recipe of the process of Example 1, and polymerization was carried out by a procedure which was the same in all other respects to Example 1 to produce a composition. A film of 0.04 mm. thickness formed from this composition had even higher transparency and exhibited a light transmission equal to that of the reference film indicated in the above table. Although the low-temperature brittleness in terms of ruptured test pieces was 32 percent, this is far superior to that of the reference film.

EXAMPLE 3

The procedure of Example 1 was carried out except for the following deviations: In the rubber plastic preparation, exactly the same polymerization of the rubber component was carried out, but to the resulting batch, 700 g. of methyl methacrylate containing 0.7 g. of cumene hydroperoxide and 3.5 g. of triethylene glycol dimethacrylate, 0.35 g. of Rongalite, and 2,100 g. of distilled water were added, and the resulting batch was agitated at high speed for 30 minutes. The batch was then raised in temperature to 60 degrees C. and caused to react for 6 hours.

The resulting material was salted out and dried in the same manner as in Example 1, whereupon a resin was obtained with a yield of 97 percent.

the above described rubber plastic (resin powder) was further blended for 30 minutes at room temperature.

A film of 0.04-mm. thickness produced from the resulting composition by the same procedure as set forth in Example 1 exhibited a percentage rupture of 8 percent in the test for low-temperature brittleness, on which point the film of this example was superior to that of Example 1. However, the film of this example exhibited a light transmission through 450 m$\mu$ of 85 percent, while that of a reference film was 88 percent. Thus, the transparency of the film of this example was slightly less than that of the film of Example 1.

EXAMPLE 5

900 g. of chloroprene, a monomer mixture of 400 g. of 2,3-dichlorobutadiene, 5 g. of divinylbenzene, and 1.0 g. of cumene hydroperoxide, and 2,500 g. of distilled water containing 10 g. of dioctyl sodium sulphosuccinate, 0.03 g. of ferrous sulphate ($FeSO_4 \cdot 7H_2O$), 0.05 g. of EDTA-disodium dihalide, 0.5 g. of Rongalite, and 0.225 g. of sodium pyrophosphate were charged under a vacuum into a 10-litre autoclave and caused to undergo polymerization for 6 hours at 30 degrees C.

Then, to the resulting batch, a monomer mixture of 0.5 g. of cumene hydroperoxide, 250 g. of methyl methacrylate, 250 g. of styrene, and 5 g. of divinylbenzene, 0.25 g. of Rongalite, and 1,500 g. of distilled water were added, and the resulting batch was agitated at high speed for 30 minutes. Thereafter, the batch was heated to 60 degrees C. and caused to react for 6 hours, whereupon a latex was obtained.

This latex was salted out with a 1-percent solution of hydrochloric acid, neutralized with sodium pyrophosphate, and filtered. The substance thus filtered out was dried, whereupon a rubber plastic powder was obtained with a yield of 98.5 percent.

Seperately, 1 part of epoxidated soybean oil, 5 parts of acetyl tributyl citrate and 5 parts of the rubber plastic obtained in the above described manner were added to 100 parts of a vinylidene chloride resin prepared by suspension polymerization from 80 parts of vinylidene chloride and 20 parts of vinyl chloride, and the resulting batch was blended at room temperature for 30 minutes.

The resulting composition was heated and melt-extruded by means of an ordinary screw extruder into a thick-wall tube structure. After rapid cooling, this structure was clamped in a mould for a narrow-neck bottle of 300-cc. capacity. The mould was heated to 80 degrees C. and compressed air was forced into the tube structure to form a narrow-neck bottle.

As a reference sample, a similar bottle was produced by blending with the same vinylidene chloride copolymer as described above 1 part of epoxidated soybean oil and 5 parts of acetyl tributyl citrate and compared with the bottle produced by the procedure of this example. While both bottles exhibited excellent transparency, drop tests from a height of 1 metre on a large number of bottles of each kind filled with water at 5 degrees C. resulted in a breakage percentage of 60 percent in the case of the reference bottle. In comparison, the breakage percentage was 18 percent in the case of the bottle containing the rubber plastic according to the invention.

EXAMPLE 6

A 10-litre autoclave with an agitator was filled with nitrogen to drive out air and charged with a monomer mixture of 1,200 g. of butadiene containing 1.5 g. of isopropylbenzene hydroperoxide, 300 g. of styrene, and 7.5 g. of divinylbenzene and 4,500 g. of distilled water containing 15 g. of potassium oleate, 0.075 g. of EDTA-disodium dihydride, 0.75 g. of Rongalite, and 0.045 g. of ferrous sulphate ($FeSO_4 \cdot 7H_2O$). The batch thus charged was caused to react at 40 degrees C. for approximately 15 hours until no further drop in pressure could be observed.

Then, to the resulting batch, a monomer mixture of 10 g. of divinylbenzene containing 0.4 g. of isopropylbenzene, 200 g. of methyl methacrylate, and 200 g. of styrene, 0.2 g. of Rongalite, and 1,200 g. of distilled water were added, and the resulting batch was agitated at high speed for 30 minutes, then heated to 60 degrees C., and caused to react for 4 hours.

To the resulting batch, a monomer mixture of 100 g. of methyl methacrylate containing 0.1 g. of isopropylbenzene hydroperoxide and of 0.4 g. of divinylbenzene, 0.05 g. of Rongalite, and 300 g. of distilled water were further added. The resulting batch was agitated thoroughly for 30 minutes and then caused to react at 60 degrees C. for 6 hours, whereupon a latex was obtained.

This latex was salted out with a 0.05-percent solution of hydrochloric acid, neutralized with sodium pyrophosphate, then heated to 85 degrees C. to agglomerate the particles, and filtered. The substance filtered out was washed with water and dried, whereupon a rubber plastic resin of $\eta_{sp./c.} = 0.02$ was obtained with a yield of 98 percent.

This rubber plastic resin was used to produce a film of 0.04-mm. thickness by the procedure set forth in Example 1. This film exhibited a transparency even higher than that of the film of Example 1, the light transmission being 88 percent. Furthermore, the rupturing percentage at 5 degrees C. was 24 percent.

On one hand, the above described preparation of the rubber plastic resin was carried out in exactly the same manner up to the end of the first stage of preparing the rubber latex, but the divinylbenzene (10 g. and 0.4 g.) among the monomer compositions respectively in the graft polymerizations of the second and third stage was omitted. In other respects the same procedure as described above was followed, whereupon a rubber plastic resin of $\eta_{sp./c.} = 0.052$ was obtained with a yield of 98 percent.

When this rubber plastic resin was used to produce a film in the same manner as before, the resulting film exhibited a light transmission of 68 percent, and a rupture percentage of 43 percent, which are quite unsatisfactory.

EXAMPLE 7

The procedure of the first-stage rubber latex polymerization in the process set forth in Example 5 was followed except for the use of 300 g. of acrylonitrile in place of 300 g. of styrene. The remaining two polymerization stages were carried out in the same manner as set forth in Example 5, whereupon a rubber plastic resin of $\eta_{sp./c.} = 0.022$ was obtained.

When this rubber plastic resin was used to produce a 0.04-mm. film in the same manner as set forth in Example 1, a film exhibiting a light transmission of 85 percent and a rupture percentage of 28 percent was obtained.

EXAMPLE 8

A 10-litre autoclave with an agitator was charged in the same manner as in Example 5 with a monomer mixture of 1,200 g. of butadiene, 300 g. of vinylidene chloride, and 7.5 g. of divinylbenzene, 1.5 g. of isopropylbenzene hydroperoxide, 0.045 g. of ferrous sulphate ($FeSO_4 \cdot 7H_2O$), 0.075 g. of EDTA-disodium hydride, 0.75 g. of Rongalite, 0.225 g. of sodium pyrophosphate, 15 g. of dioctyl sodium sulphosuccinate, and 4,500 g. of distilled water. The batch was caused to react at 50 degrees C. for 17 hours, and the residual monomers were removed by blowing nitrogen at 50 degrees C. into the batch. As a result, a rubber latex was obtained with a polymerization yield of 89 percent.

Next, to this latex, a monomer mixture of 100 g. of methyl methacrylate, 200 g. of vinylidene chloride, and 5 g. of divinylbenzene, 0.4 g. of isopropylbenzene hydroperoxide, 0.2 g. of Rongalite, and 1,200 g. of distilled water were added. The resulting batch was agitated thoroughly for 30 minutes, and heated to 60 degrees C. to react for 6 hours.

Then, to the batch thus obtained, 100 g. of methyl methacrylate, 0.4 g. of divinylbenzene, 0.1 g. of isopropylbenzene hydroperoxide, 0.05 of Rongalite, and 300 g. of distilled water were further added. The resulting batch was thoroughly agitated for 30 minutes and then caused to react at 60 degrees C. for 6 hours.

From the latex thus obtained, a rubber plastic resin was produced by the same procedure as described in Example 1. The yield of this rubber plastic resin was 91 percent, and the $\eta_{sp./c.}$ thereof was 0.021.

From this rubber plastic resin, a 0.04-mm. film was produced in the same manner as in Example 1. This film exhibited a light transmission of 88 percent and a rupturing percentage of 34 percent.

EXAMPLE 9

A monomer composition of 720 g. of chloroprene, 480 g. of 1,3-dichlorobutadiene, 5 g. of divinylbenzene, and 1.2 g. of isopropylbenzene hydroperoxide and 3,600 g. of distilled water containing 12 g. of dioctyl sodium sulphosuccinate, 0.6 g. of Rongalite, 6.36 g. of ferrous sulphate ($FeSO_4 \cdot 7H_2O$), 0.06 g. of EDTA-disodium dihalide, and 3.0 g. of sodium pyrophosphate were charged under a vacuum into a 10-litre autoclave and caused to polymerize at 20 degrees C. for 4 hours.

Next, to the resulting batch, 800 g. of 1,3-dichlorobutadiene containing 3 g. of divinylbenzene and 0.8 g. of isopropylbenzene hydroperoxide, 0.4 g. of Rongalite, and 2,400 g. of distilled water were added, and the resulting batch was caused to react for 6 hours, whereupon a latex was obtained.

To this latex, an emulsion containing 20 g. of 2,6-di-tertiary butyl hydroxytoluene as a stabilizer was added, and the agitation of the batch was continued for 3 hours to cause this stabilizer to be thoroughly adsorbed. Then the latex material was salted out with a 3-percent aqueous solution of sodium chloride, neutralized with sodium pyrophosphate, separated by filtration, and dried, whereupon a white powder of a rubber plastic was obtained with a yield of 98 percent.

By using 10 parts of this rubber plastic, narrow-neck bottles each of 300-cc. capacity were fabricated similarly as described in Example 5 and subjected to the same strength test as set forth in Example 5, whereupon the breakage percentage was 12 percent. Furthermore, these bottles had excellent transparency.

As described above in detail with respect to specific examples, the vinylidene chloride resin compositions according to the present invention provide shaped articles formed therefrom with toughness at low temperatures (i.e., prevent their low-temperature embrittlement) and excellent transparency without impairing the other desirable properties of vinylidene chloride resin. Moreover, these compositions of the invention afford forming of such shaped articles through the use of conventional blenders and extruding means without the need for resorting to special procedures or equipment.

What I claim is:

1. Vinylidene chloride copolymer composition consisting essentially of:
a copolymer resin (A) of from 60 to 90 parts of vinylidene chloride and from 5 to 40 parts of a monomer copolymerizable with vinylidene chloride; a polymeric composition (B) prepared by adding from 20 to 50 parts of at least one monomer (b) selected from the group consisting of styrene, vinylidene chloride, methylmethacrylate and 2,3-dichlorobutadiene, and from 0.01 to 5 parts of a divinyl cross-linking agent (c) to a latex containing from 50 to 80 parts of a rubber component (a) the principal monomer constituent of which is a 1,3-conjugated diene and causing the resulting mixture to polymerize, and an additive (C) selected from the group consisting of stabilizers and plasticizers ordinarily used in vinylidene chloride copolymer resins and combinations of said stabilizers and plasticizers, there being from 5 to 30 parts of (B) and from 0.01 to 15 parts of (C) for each 100 parts of (A), all proportions in parts being by weight.

2. The vinylidene chloride copolymer composition as claimed in claim 1 in which the latex containing the rubber components (a) is obtained by causing emulsion polymerization of a mixture of from 50 to 100 parts of at least one 1,3-conjugated diene selected from the group consisting of 1,3-butadiene, isoprene, chloroprene, and 2,3-dichlorobutadiene, at most 50 parts of at least one monomer having a vinyl radical selected from the group consisting of styrene, acrylonitrile, lower esters of methacrylic acid, vinylidene chloride, and 2,3-dichlorobutadient at at most 5 parts of the divinyl cross-linking agent, all proportions in parts by weight.

3. The vinylidene chloride copolymer composition as claimed in claim 1 in which the divinyl cross-linking agent is selected from the group consisting of divinylbenzene, mono-, di-, tri-, and tetraethylene glycol dimethacrylates, and 1,3-butyl glycol dimethacrylate.

4. The vinylidene chloride copolymer composition as claimed in claim 2 in which the divinyl cross-linking agent is selected from the group consisting of divinylbenzene, mono-, di-, tri-, and tetraethylene glycol dimethacrylates, and 1,3-butyl dimethacrylate.

References Cited
UNITED STATES PATENTS

| | | |
|---|---|---|
| 2,939,852 | 6/1960 | Schmidle. |
| 3,118,854 | 1/1964 | Hess et al. |
| 3,328,488 | 6/1967 | Delacretaz et al. |

MURRAY TILLMAN, Primary Examiner

W. T. BRIGGS, Assistant Examiner

U.S. Cl. X.R.

260—29.7, 890